United States Patent
Yeo

(10) Patent No.: US 8,147,998 B2
(45) Date of Patent: Apr. 3, 2012

(54) SECONDARY BATTERY WITH RUPTURE GROOVE

(75) Inventor: Kwangsoo Yeo, Yongin-si (KR)

(73) Assignee: Samsung SDI Co., Ltd., Gibeung-gu, Yongin-si, Gyeonggi-do (KR)

(*) Notice: Subject to any disclaimer, the term of this patent is extended or adjusted under 35 U.S.C. 154(b) by 392 days.

(21) Appl. No.: 12/379,775

(22) Filed: Feb. 27, 2009

(65) Prior Publication Data

US 2009/0305114 A1    Dec. 10, 2009

(30) Foreign Application Priority Data

Jun. 9, 2008   (KR) ........................ 10-2008-0053800

(51) Int. Cl.
*H01M 2/12* (2006.01)
(52) U.S. Cl. .......................................... 429/56; 429/57
(58) Field of Classification Search ............... 429/53–57
See application file for complete search history.

(56) References Cited

U.S. PATENT DOCUMENTS

| | | | |
|---|---|---|---|
| 4,965,149 A | 10/1990 | Ashihara et al. | |
| 7,140,380 B2 * | 11/2006 | Marubayashi et al. | 137/68.25 |
| 2003/0077505 A1 * | 4/2003 | Goda et al. | 429/56 |
| 2004/0265683 A1 | 12/2004 | Merril et al. | |
| 2005/0147873 A1 * | 7/2005 | Malec | 429/56 |
| 2005/0181272 A1 * | 8/2005 | Kim | 429/56 |
| 2006/0141354 A1 | 6/2006 | Kwon | |

FOREIGN PATENT DOCUMENTS

| | | |
|---|---|---|
| JP | 08-250155 | 9/1996 |
| JP | 10-269998 A | 10/1998 |
| JP | 11-185714 A | 7/1999 |
| JP | 11185714 | 7/1999 |
| JP | 11-213978 | 8/1999 |
| JP | 2001-143664 A | 5/2001 |
| JP | 2001143664 | 5/2001 |
| JP | 2002025525 A * | 1/2002 |
| KR | 10-1989-0015442 A | 10/1989 |
| KR | 10-2002-0080428 A | 10/2002 |
| KR | 10-0366079 | 12/2002 |
| KR | 1020050018269 A | 2/2005 |

OTHER PUBLICATIONS

Chinese Office Action issued by SIPO, dated Mar. 23, 2011, corresponding to Chinese Patent Application No. 200910132634.1, together with full English translation.

Navel BC: "An Innovative Rupture Disk Vent for Lithium Batteries" Extended Abstracts, Electrochemical Society, Princeton, New Jersey, US, vol. 87-02, Oct. 18, 1987, p. 45/46.

Chinese Office action issued on Sep. 1, 2011, corresponding to Chinese Patent application No. 200910132634.1. English Translation attached herewith.

* cited by examiner

*Primary Examiner* — Tracy Dove
(74) *Attorney, Agent, or Firm* — Robert E. Bushnell, Esq.

(57) ABSTRACT

A secondary battery prevents shorts between electrodes by discharging an electrode assembly downward through a can provided with notches at a lower part thereof when the battery is vertically compressed. The secondary battery includes: an electrode assembly; a can having an upper opening to receive the electrode assembly and a notched part at a lower part thereof; and a cap assembly to seal the can.

10 Claims, 6 Drawing Sheets

SECONDARY BATTERY WITH RUPTURE GROOVE

CLAIM OF PRIORITY

This application makes reference to, incorporates the same herein, and claims all benefits accruing under 35 U.S.C. 119 from an application earlier filed in the Korean Intellectual Property Office on the 9 Jun. 2008 and there duly assigned Serial No. 10-2008-0053800.

BACKGROUND OF THE INVENTION

1. Field of the Invention

The present invention relates to a secondary battery.

2. Description of the Related Art

Generally, a secondary battery is manufactured by forming an electrode assembly by winding cathode and anode plates and a separator interposed between the electrodes together in a jelly-roll structure and arranging the electrode assembly in a can with electrolyte and then sealing an upper opening of the can with a cap assembly.

The can has a roughly rectangular shape in a rectangular type secondary battery and is a metal container made of lightweight conductive metal, such as aluminum (Al) or an aluminum alloy. Therefore, the can functions as one terminal of the battery. The can may be formed by a deep drawing process.

SUMMARY OF THE INVENTION

According to one aspect of the present invention, a secondary battery is provided, which includes: an electrode assembly; a can having an upper opening to receive the electrode assembly and a notched part at a lower part thereof; and a cap assembly to seal the can.

The can may include a wide surface, a narrow surface and a lower surface and the notched part may be formed on the wide and narrow surfaces in a shape of a line parallel to the lower surface.

The notched part may be formed of a rupture groove group including a plurality of rupture grooves.

A space between any two adjacent rupture grooves may be narrower than a width of any other one of the plurality of rupture grooves.

A depth of the rupture grooves may be 55 to 75% of a thickness of wide or narrow surface of the can.

A rupture strength of the rupture grooves may be lower than a welding strength between the can and cap assembly, when the cap assembly is welded to the can.

A plurality of notched parts may be formed in a direction parallel to the lower surface.

The notched part may be formed in a trench including a linearly continuous rupture groove.

In addition, the notched part may be formed in a trench including a zigzag continuous rupture groove in a direction parallel to the lower surface.

The can may include a wide surface, a narrow surface and a lower surface and the notched part may be formed on the lower surface in a shape of a line.

The notched part may be formed of a rupture groove group including a plurality of rupture grooves.

A space between any two adjacent rupture grooves may be narrower than a width of any other one of the plurality of rupture grooves.

A depth of the rupture grooves may be 55 to 75% of a thickness of the lower surface of the can.

The notched part may be formed in a trench including linearly continuous rupture grooves.

In addition, the notched part may be formed in a trench including zigzag continuous rupture grooves in a direction parallel to the lower surface.

The can may be a cylindrical or polygonal can.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicated the same or similar components, wherein:

FIG. 2b is a sectional view taken along 'I-I' line of FIG. 2a;

DETAILED DESCRIPTION OF THE INVENTION

Figure 1:
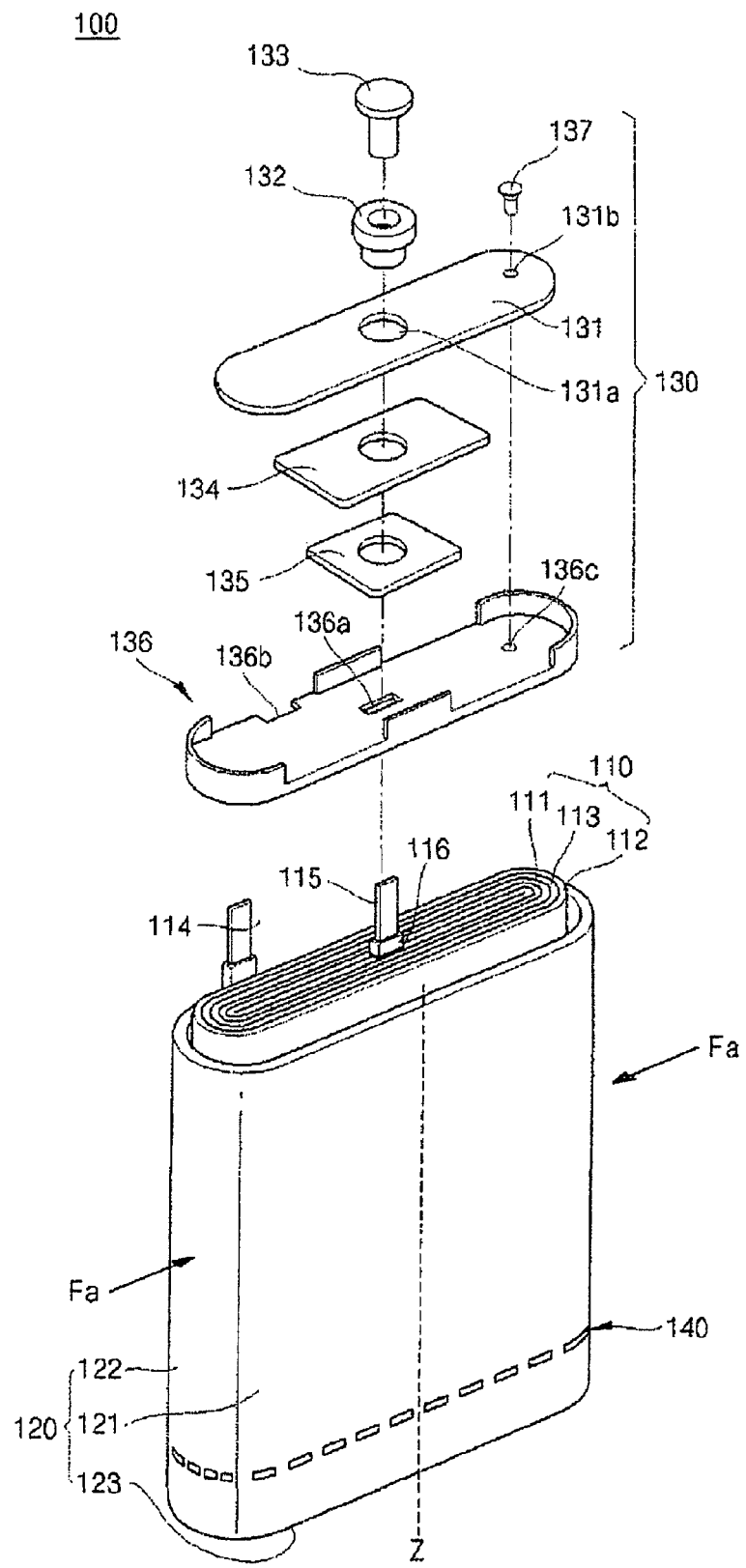
FIG. 1 is an exploded perspective view of a secondary battery according to one exemplary embodiment of the present invention.

Hereinafter, exemplary embodiments of the present invention are described in detail with reference to the accompanying drawings. The aspects and features of the present invention and methods for achieving the aspects and features will be apparent by referring to the embodiments described in detail below with reference to the accompanying drawings. However, the present invention is not limited to the embodiments disclosed hereinafter, but can be implemented in diverse forms. The matters defined in the description, such as the detailed construction and elements, are merely specific details provided to assist those of ordinary skill in the art in a comprehensive understanding of the present invention, and the present invention is only defined within the scope of the appended claims. In the entire description of the present invention, the same drawing reference numerals are used for the same elements across various figures.

Figure 2A:
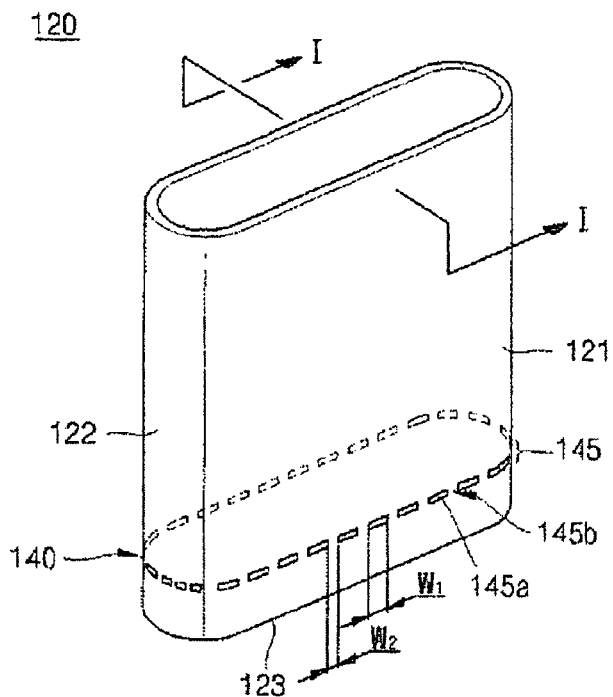
FIG. 2a is a perspective view of a can according to a first embodiment of the present invention.
Figure 2B:
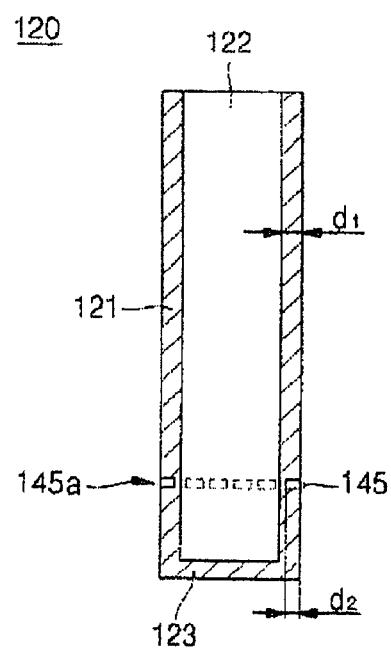

FIG. 1 is an exploded perspective view of a secondary battery according to one exemplary embodiment of the present invention and FIG. 2a is a perspective view of a can according to a first embodiment of the present invention and FIG. 2b is a sectional view taken along 'I-I' line of FIG. 2a.

Referring to FIGS. 1, 2a and 2b, a secondary battery 100, for example, a lithium secondary battery, includes an electrode assembly 110, a can 120 and a cap assembly 130. A relatively thin notched part 140 is formed at a lower part of the can 120. During a vertical compression test of the lithium secondary battery 100, the notched part 140 is ruptured and thus, the electrode assembly 110 is discharged downward from the can 120. In other words, the lithium secondary battery 100 prevents a short between electrodes at an upper part of the electrode assembly 110 by discharging the electrode assembly 110 downward by using the can 120 provided with the notched part 140 at the lower part thereof during the vertical compression test.

The electrode assembly 110 includes a cathode plate 111, an anode plate 112 and a separator 113 interposed between the cathode plate 111 and anode plate 112. In addition, the electrode assembly 110 further includes a cathode tab 114 and an anode tab 115 each having ends extending from an upper part of the electrode assembly 110 and fixed. The cathode tab 114 is withdrawn out of the cathode plate 111 and the anode tab 115 is withdrawn out of the anode plate 112. In addition, the cathode and anode tabs 114 and 115 may be made of aluminum (Al), nickel (Ni) or copper (Cu). Usually, the cathode tab 114 is made of aluminum (Al) and the anode tab 115 is made of nickel (Ni). In addition, an insulation tape 116 is wound on the parts of the cathode and anode tabs 114 and 115 extending from the upper part of the electrode assembly 110 to prevent a short between the cathode and anode plates 111 and 112. On the other hand, to improve electrical capacity, the electrode assembly 110 is usually formed by interposing the separator 113 between the cathode and anode plates 111 and 112 to insulate them from each other and winding them together in a jelly-roll structure. Cathode and anode active materials are respectively coated on the cathode and anode plates 111 and 112. The cathode active material may be a highly stable lithium manganese compound and the anode active material may be a carbonic compound. However, the present invention is not limited thereto.

The can 120 includes a wide surface 121, a narrow surface 122 and a lower surface 123 sealing lower parts of the wide and narrow surfaces 121 and 122, thereby forming a space to receive the electrode assembly 110. The notched part 140 is formed at the lower part of the can 120. In addition, an opening is formed at an upper part of the can 120 and the electrode assembly 110 is inserted through the opening. The opening is sealed by the cap assembly 130. In other words, in a rectangular secondary battery, the can 120 is made of roughly a rectangular shape having one open end and can be made by a process, such as deep drawing. The can 120 may be made of a lightweight conductive metal such as aluminum (Al) or an aluminum alloy. The can 120 can function as a terminal by itself.

In the can 120, the wide surface 121 is defined as a side wall having a relatively long width or length of a horizontal edge. A pair of wide surfaces 121 are spaced to face each other, thereby forming front and rear surfaces of the can 120. The narrow surface 122 is defined as a side wall having a relatively short width or length of a horizontal edge. The narrow surface 122 is continued to a side edge of the wide surface 121. The pair of narrow surfaces 122 are spaced to face each other, thereby forming both side surfaces of the can 120. The narrow surface 122 may be formed round. The lower surface 123 corresponds to the upper opening of the can 120 and is sealed. In addition, the lower surface 123 is continued to the lower parts of the wide and narrow surfaces 121 and 122. The lower surface 123 supports structures or contents of the lithium secondary battery 100.

The notched part 140 may be formed in a shape of stripe parallel to the lower surface 123. In addition, the notched part 140 is formed at the lower part of the can 120, that is, the lower parts of the wide and narrow surfaces 121 and 122. The notched part 140 may be formed of a rupture groove group 145 consisting of a plurality of rupture grooves 145a. The rupture groove group 145 further includes a space regions 145b.

The space regions 145b is defined as a region that corresponds to a space between two adjacent rupture grooves 145a. In other words, the plurality of rupture groove 145a and space regions 145b are sequentially and repeatedly formed on the same line, thereby forming the rupture groove group 145. The space regions 145b are provided in portions of the wide and narrow surfaces 121 and 122 and thus has the same thickness (d1) as the wide and narrow surfaces 121 and 122.

On the other hand, it is desirable that a width (w1) of the rupture grooves 145a is larger than a width (w2) of the space regions 145b. that is the reason that the entire rupture groove group 145 is easily ruptured when a force (Fa) is applied to the both narrow surface 122 in the vertical direction (z) during the vertical compression test and the electrode assembly 110 contained in the can 120 can be smoothly discharged downward. Accordingly, the width (w1) of the rupture groove 145a and the width (w2) of the space regions 145b are important factors that determine fracture strength in the vertical compression test. The electrode assembly 110 is discharged downward because the lower part of the electrode assembly 110 has a relatively simple structure and thus, the possibility of a short is relatively low.

On the other hand, the cathode and anode tabs 114 and 115 extend from the upper part of the electrode assembly 110 and are electrically coupled to the cap assembly 130 in a complicated structure. In addition, even when the cathode tab 114 or anode tab 115 is respectively extended upward or downward from the electrode assembly 110, the lower part of the electrode assembly 110 has a relatively simple structure and thus, the possibility of a short is relatively low compared to the upper part of the electrode assembly 110.

On the other hand, when the width (w2) of the space regions 145b is larger than the width (w1) of the rupture grooves 145a, the cap assembly 130 welded to the upper part of the can 120 may be opened before the entire rupture groove group 145 is ruptured and thus the electrode assembly 110 may be discharged upward in the vertical compression test. Accordingly, a short between electrodes or a fire may occur as in the conventional battery. It is desirable that a depth (d2) of the rupture grooves 145a is 55 to 75% of a thickness (d1) of the wide or narrow surface of the can 120. The ratio of the depth (d2) to the thickness (d1) is another important factor that determines the fracture strength in the vertical compression test. It is desirable that the fracture strength of the rupture grooves 145a is lower that the welding strength between the can 120 and cap assembly 130 when they are welded together. When the depth (d2) of the rupture grooves 145a is less than 55% of the thickness (d1) of the can 120, the cap assembly 130 may be opened before the entire rupture groove group 145 is ruptured and thus the electrode assembly 110 may be discharged upward in the vertical compression test.

In addition, the rupture groove group 145 may be partially ruptured or may not be ruptured. In other words, when the depth (d2) of the rupture grooves 145a is less than 55% of a thickness (d1) of the wide or narrow surface of the can 120, the fracture strength of the rupture grooves 145a is higher that welding strength between the can 120 and cap assembly 130. On the other hand, when the depth (d2) of the rupture grooves 145a is more than 75% of a thickness (d1) of the wide or narrow surface of the can 120, the inside of the rupture groove 145a is bent to cause damage to the electrode assembly 110 during the assembling process of the lithium secondary battery 100. In addition, the can 120 may be partially crushed, or the part above the rupture groove group 145 may be downward crushed when the battery is pressurized to install structures such as the cap assembly 130 at the upper part. Thus, when the width (w1) of the rupture grooves 145a is larger than the width (w2) of the space regions 145b and the depth (d2) of the rupture groove 145a is 55 to 75% of a thickness (d1) of the wide or narrow surface of the can 120, the electrode assembly 110 can be smoothly discharged downward in the vertical compression test and thus a short between electrodes can be prevented. Thus, the safety of the lithium secondary battery 100 is improved.

On the other hand, the notched part 140 consists of one rupture groove group 145 in FIGS. 1, 2a and 2b. However, the present invention is not limited thereto. For example, the notched part 140 may further include another rupture groove group 145 of a stripe shape at different positions of the wide and narrow surfaces 121 and 122 in a direction parallel to the rupture groove group 145 formed at the lower part of the can 120. In other words, the number of rupture groove groups 145 is not limited.

The cap assembly 130 is provided at the upper part of the can 120 and finished by welding. The welding strength between the cap assembly 130 and can 120 is greater than the fracture strength of the notched part 140. The cap assembly 130 includes a cap plate 131, a gasket 132, an electrode terminal 133, an insulation plate 134, a terminal plate 135, an insulation case 136 and a stopper 137.

The cap plate 131 includes a terminal hole 131a and an electrolyte injection hole 131b. The electrode terminal 133 can be inserted through the terminal hole 131a. The electrode terminal 133 is assembled with the gasket 132 made of an insulating material at a side wall thereof and then inserted into the terminal hole 131a to insulate the metallic cap plate 131 and electrode terminal 133 from each other.

On the other hand, the electrolyte injection hole 131b is provided at one side of the cap plate 131 to inject electrolyte into the can 120. After the electrolyte is injected through the electrolyte injection hole 131b, the electrolyte injection hole 131b is sealed with the stopper 137 to prevent leakage of the electrolyte. The insulation plate 134 is provided under the cap plate 131. The terminal plate 135 is provided under the insulation plate 134. Thus, the insulation plate 134 insulates the cap plate 131 from the terminal plate 135.

On the other hand, the terminal plate 135 is combined with a lower end of the electrode terminal 133. Accordingly, the anode plate 112 of the electrode assembly 110 is electrically coupled to the electrode terminal 133 through the anode tab 115 and terminal plate 135. The cathode plate 111 of the electrode assembly 110 is electrically coupled to the cap plate 131 or can 120 through the cathode tab 114.

The insulation case 136 is provided under the terminal plate 135. The insulation case 136 includes an anode tab aperture 136a, a cathode tab aperture 136b and an electrolyte injection hole 136c.

The stopper 137 is used to seal the electrolyte injection hole 131b after the electrolyte is injected into the electrolyte injection hole 131b. In addition to the stopper 137, the electrolyte injection hole 131b may be sealed by pressing a ball therein.

As described above, the lithium secondary battery 100 includes the can provided with the notched part 140 at the lower part thereof. Thus, the lithium secondary battery 100 can be smoothly discharged downward in the vertical compression test. In addition, a short between the electrodes can be prevented by smoothly discharging the electrode assembly 110 downward. Thus, the safety of the lithium secondary battery 100 is improved.

A secondary battery, for example, a lithium secondary battery, according to a second embodiment of the present invention is explained below.

Figure 3:
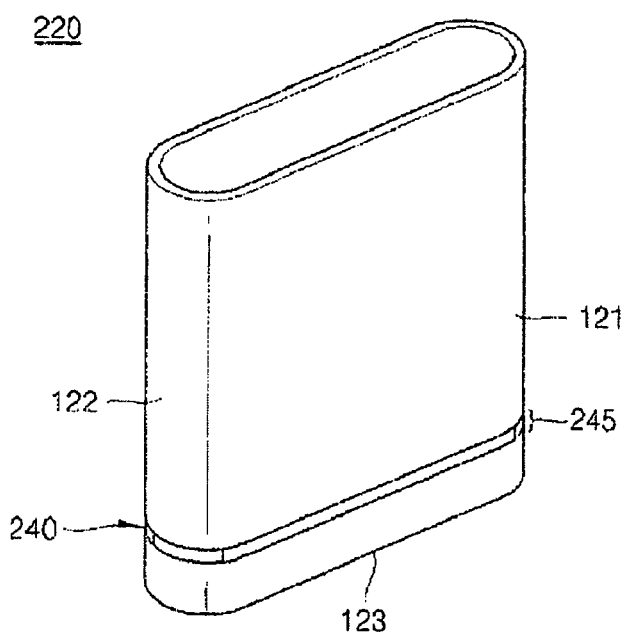
FIG. 3 is a perspective view of a can according to a second exemplary embodiment of the present invention.

FIG. 3 is a perspective view of a can according to the second exemplary embodiment.

The lithium secondary battery of the second embodiment has the same elements as the lithium secondary battery of the first embodiment except for a structure of a notched part. Accordingly, the same drawing reference numerals are used for the same elements and a detailed explanation thereof has been omitted. Thus, a notched part which different from the first embodiment is mainly explained below.

The lithium secondary battery 100 includes an electrode assembly 110, a can 220 and a cap assembly 130. A relatively thin notched part 240 is formed at a lower part of the can 220. The can 220 is formed by the same material and process as the can 120 of the first embodiment and performs the same function.

Referring to FIG. 3, the can 220 includes a wide surface 121, a narrow surface 122 and a lower surface 123 sealing lower parts of the wide and narrow surfaces 121 and 122, thereby forming space to receive the electrode assembly 110. The can 220 further includes the notched part 240.

The notched part 240 is formed at the lower part of the can 220, that is, at the lower parts of the wide and narrow surfaces 121 and 122. In addition, the notched part 240 may be formed at the lower part of the can 220 in a shape of stripe parallel to the lower surface 123. The notched part 240 is formed in a shape of a trench consisting of a linearly continuous rupture groove 245.

The notched part 240 is formed of single rupture groove 245 differently from the notched part 140 of the first embodiment in which the notched part 140 is formed of the rupture groove group 145 including the plurality of rupture grooves 145a and space regions 145b. Thus, the lithium secondary battery of the second embodiment is more easily ruptured in the vertical compression test than the first embodiment and thus can discharge the electrode assembly 110 more smoothly.

A lithium secondary battery according to a third embodiment of the present invention is explained below.

Figure 4:
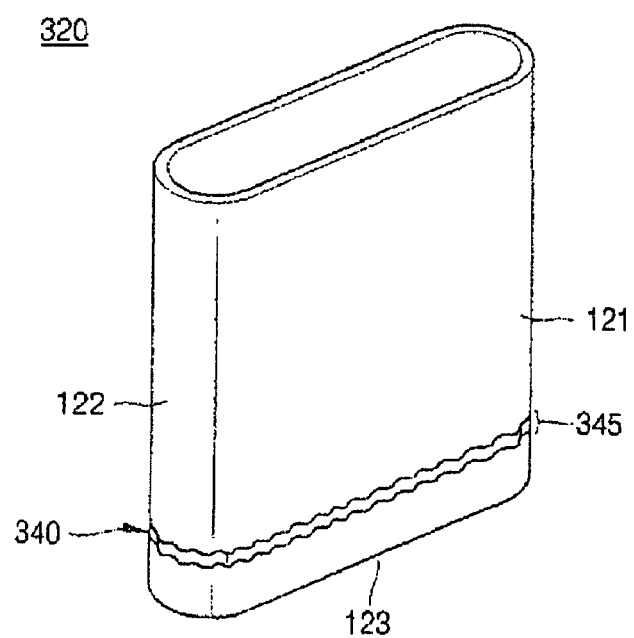
FIG. 4 is a perspective view of a can according to a third exemplary embodiment of the present invention.

FIG. 4 is a perspective view of a can according to the third exemplary embodiment.

The lithium secondary battery of the third embodiment has the same elements as the lithium secondary battery of the first embodiment except for a structure of a notched part. Accordingly, the same drawing reference numerals are used for the same elements and a detailed explanation thereof has been omitted. Thus, a notched part different from the first embodiment is mainly explained below.

The lithium secondary battery 100 includes an electrode assembly 110, a can 320 and a cap assembly 130. A relatively thin notched part 340 is formed at a lower part of the can 320. The can 320 is formed by the same material and process as the can 120 of the first embodiment and performs the same function.

Referring to FIG. 4, the can 320 includes a wide surface 121, a narrow surface 122 and a lower surface 123 sealing lower parts of the wide and narrow surfaces 121 and 122, thereby forming space to receive the electrode assembly 110. The can 320 further includes the notched part 340.

The notched part 340 is formed at the lower part of the can 320, that is, at the lower parts of the wide and narrow surfaces 121 and 122. In addition, the notched part 340 may be formed at the lower part of the can 320 in a shape of a stripe parallel to the lower surface 123. The notched part 340 is formed as a trench having a zigzag continuous rupture groove 345 in a direction parallel to the lower surface.

The notched part 340 is formed of single zigzag rupture groove 345 differently from the notched part 140 of the first embodiment in which the notched part 140 is formed of the rupture groove group 145 including the plurality of rupture grooves 145a and space regions 145b. Thus, the lithium secondary battery of the third embodiment is more easily ruptured in the vertical compression test than the first embodiment and thus can discharge the electrode assembly 110 more smoothly.

A lithium secondary battery according to a fourth embodiment of the present invention is explained below.

Figure 5:
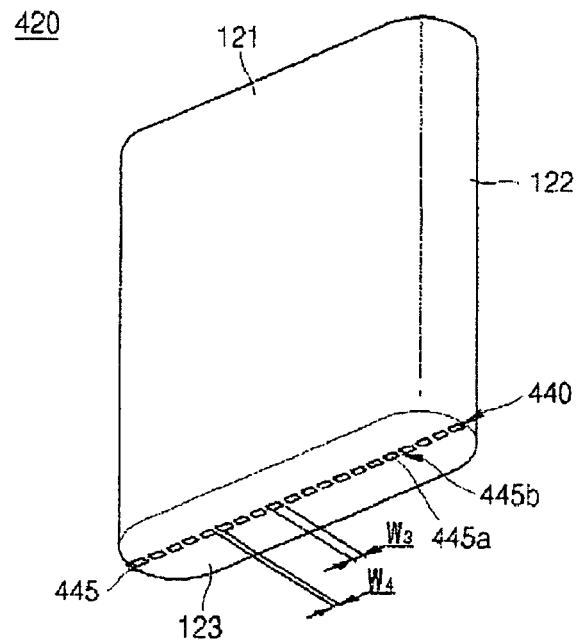
FIG. 5 is a perspective view of a can according to a fourth exemplary embodiment of the present invention.

FIG. 5 is a perspective view of a can according to the fourth exemplary embodiment.

The lithium secondary battery of the fourth embodiment has the same elements as the lithium secondary battery of the first embodiment except for a formation location of a notched part. Accordingly, the same drawing reference numerals are used for the same elements and a detailed explanation thereof has been omitted. Thus, a notched part different from the first embodiment is mainly explained below.

The lithium secondary battery 100 includes an electrode assembly 110, a can 420 and a cap assembly 130. A relatively thin notched part 440 is formed at a lower part of the can 420. The can 420 is formed by the same material and process as the can 120 of the first embodiment and performs the same function.

Referring to FIG. 5, the can 420 includes a wide surface 121, a narrow surface 122 and a lower surface 123 sealing lower parts of the wide and narrow surfaces 121 and 122, thereby forming a space to receive the electrode assembly 110. The can 420 further includes the notched part 440.

The notched part 440 is formed at the lower surface 123 of the can 420. The notched part 440 is formed of a rupture groove group 445 consisting of a plurality of rupture grooves 445a. The rupture groove group 445 further includes space regions 445b. The rupture groove group 445 is formed of the plurality of rupture groove 445a and space regions 445b that are sequentially and repeatedly formed on the same line. It is desirable that a width (w3) of the space regions 445b is larger than a width (w4) of the space regions 145b. In addition, it is desirable that a depth of the rupture grooves 445a is 55 to 75% of a thickness of the lower surface of the can 420.

The notched part 440 is formed on the lower surface 123 of the can 420 differently from the notched part 140 of the first embodiment in which the notched part 140 is formed at the lower side wall of the can 120. Thus, the lithium secondary battery of the fourth embodiment can discharge the electrode assembly 110 in the vertical compression test and improve the strength of the wide and narrow surfaces 121 and 122 more than the first embodiment.

A lithium secondary battery according to a fifth embodiment of the present invention is explained below.

Figure 6:
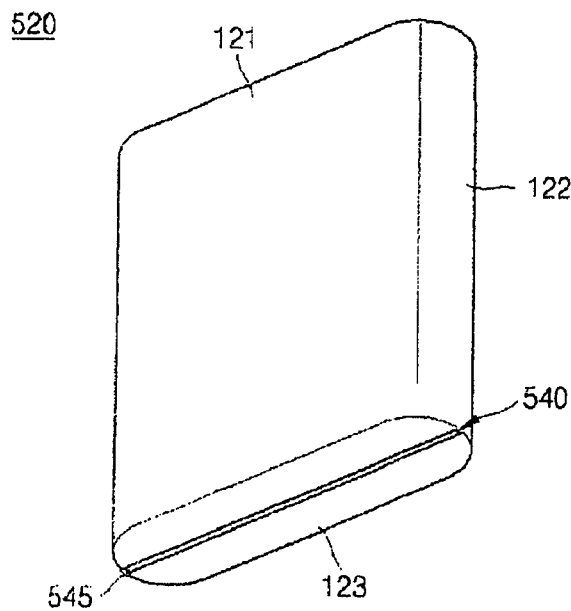
FIG. 6 is a perspective view of a can according to a fifth exemplary embodiment of the present invention.

FIG. 6 is a perspective view of a can according to the fifth exemplary embodiment.

The lithium secondary battery of the fifth embodiment has the same elements as the lithium secondary battery of the fourth embodiment except for a structure of a notched part. Accordingly, the same drawing reference numerals are used for the same elements and a detailed explanation thereof has been omitted. Thus, a notched part different from the fourth embodiment is mainly explained below.

The lithium secondary battery 100 includes an electrode assembly 110, a can 520 and a cap assembly 130. A relatively thin notched part 540 is formed at a lower part of the can 520. The can 520 is formed by the same material and process as the can 420 of the fourth embodiment and performs the same function.

Referring to FIG. 6, the can 520 includes a wide surface 121, a narrow surface 122 and a lower surface 123 sealing lower parts of the wide and narrow surfaces 121 and 122, thereby forming a space to receive the electrode assembly 110. The can 520 further includes the notched part 540.

The notched part 540 is formed at the lower surface 123 of the can 320. The notched part 540 is formed as a trench of a linearly continuous rupture groove 545.

The notched part 540 is formed of single linear rupture groove 545 differently from the notched part 440 of the fourth embodiment that is formed of the rupture groove group 445 including the plurality of rupture grooves 445a and space regions 445b. Thus, the rupture groove 545 of the lithium secondary battery of the fifth embodiment is more easily ruptured in the vertical compression test than the fourth embodiment and thus can discharge the electrode assembly 110 more smoothly.

A lithium secondary battery according to a sixth embodiment of the present invention is explained below.

Figure 7:
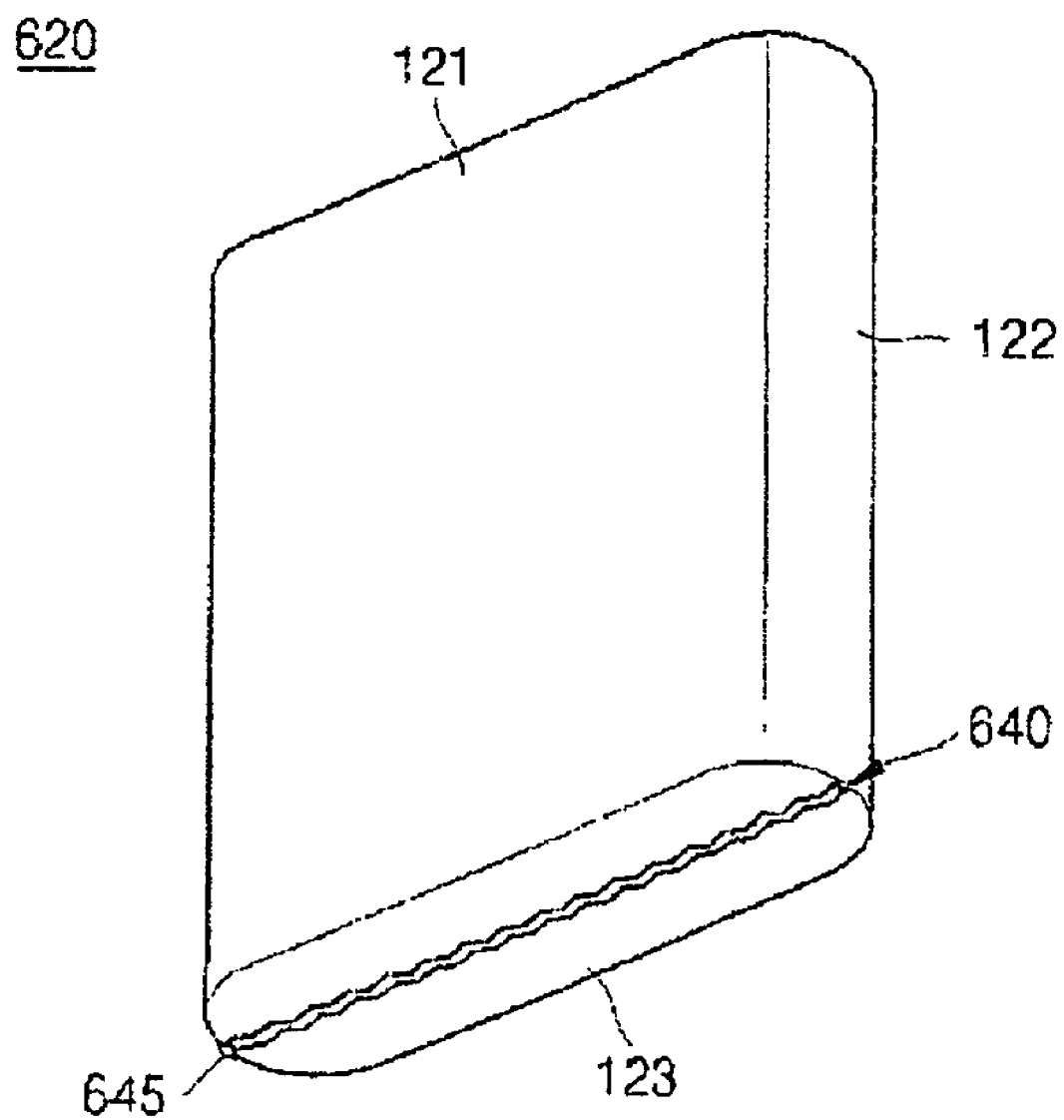
FIG. 7 is a perspective view of a can according to a sixth exemplary embodiment of the present invention.

FIG. 7 is a perspective view of a can according to the sixth exemplary embodiment.

The lithium secondary battery of the sixth embodiment has the same elements as the lithium secondary battery of the fourth embodiment except for a structure of a notched part. Accordingly, the same drawing reference numerals are used for the same elements and an explanation thereof has been omitted. Thus, a notched part different from the fourth embodiment is mainly explained below.

The lithium secondary battery 100 includes an electrode assembly 110, a can 620 and a cap assembly 130. A relatively thin notched part 640 is formed at a lower part of the can 620. The can 620 is formed by the same material and process as the can 420 of the fourth embodiment and performs the same function.

Referring to FIG. 7, the can 620 includes a wide surface 121, a narrow surface 122 and a lower surface 123 sealing lower parts of the wide and narrow surfaces 121 and 122, thereby forming a space to receive the electrode assembly 110. The can 620 further includes the notched part 640.

The notched part 640 is formed at the lower surface 123 of the can 620. The notched part 640 is formed as a trench of a zigzag continuous rupture groove 545 in a direction parallel to the lower surface 123.

The notched part 640 is formed of single zigzag rupture groove 645 differently from the notched part 440 of the fourth embodiment that is formed of the rupture groove group 445 including the plurality of rupture grooves 445a and space regions 445b. Thus, the rupture groove 645 of the lithium secondary battery of the sixth embodiment is more easily ruptured in the vertical compression test than the fourth embodiment and thus can discharge the electrode assembly 110 more smoothly.

A secondary battery, for example, a lithium secondary battery, according to another exemplary embodiment of the present invention is explained below.

Figure 8:
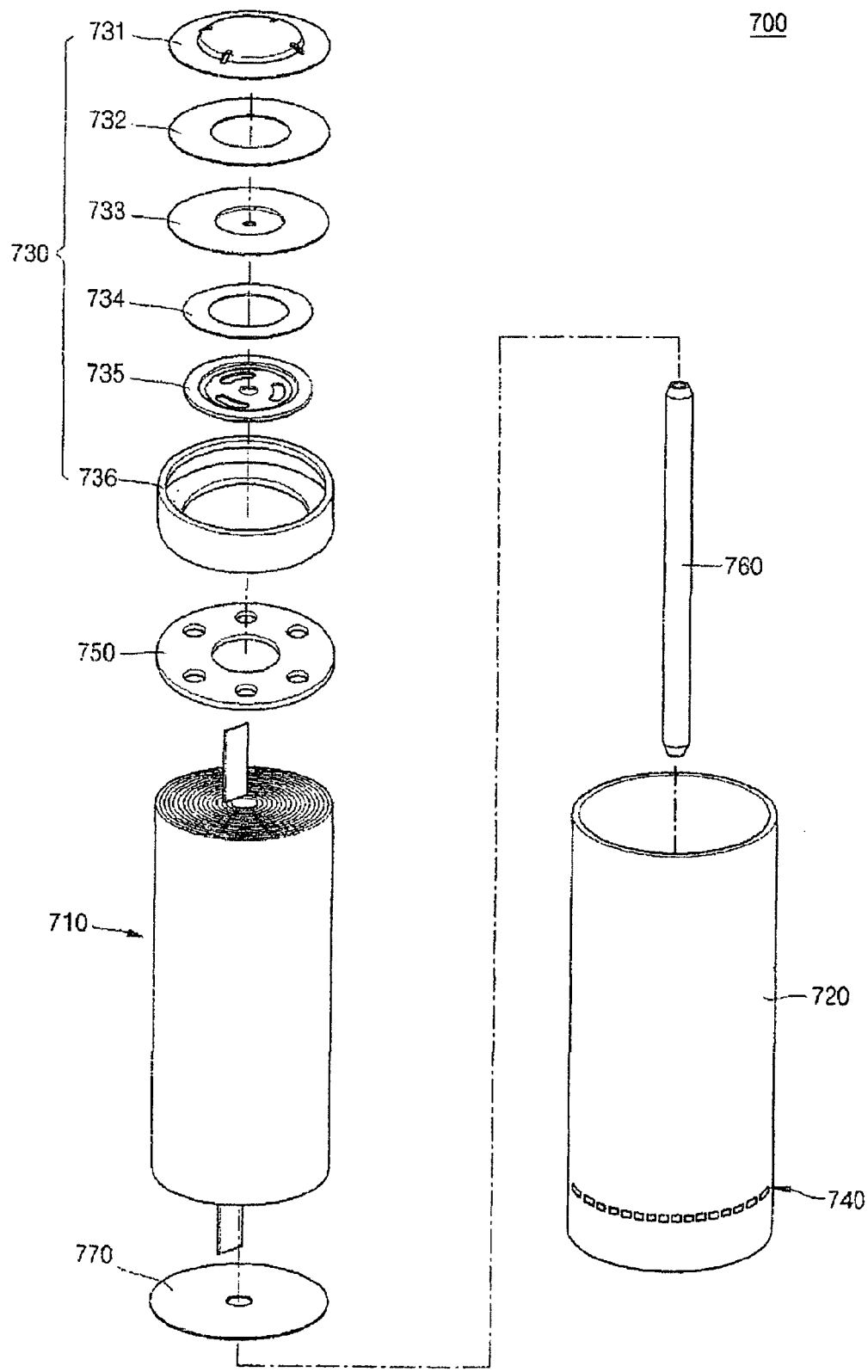
FIG. 8 is an exploded perspective view of a secondary battery according to another exemplary embodiment of the present invention.

FIG. 8 is an exploded perspective view of a lithium secondary battery according to another exemplary embodiment.

Referring to FIG. 8, the lithium secondary battery 700 is a cylindrical battery. The lithium secondary battery 700 includes an electrode assembly 710, a cylindrical can 720 and a cap assembly 730 sealing an upper opening of the cylindrical can 720. The cap assembly 730 includes a cap up 731, a cap up 731 provided under the cap up 731, a safety vent 733 provided under the secondary protection device 732, an insulator 734 provided under the safety vent 733, a cap down 735 provided under the insulator 734 and a gasket 736 surrounding the above elements. In addition, the lithium secondary battery 700 includes an upper insulation plate 750. In addition, the lithium secondary battery 700 further includes a center pin 760 that is inserted into the electrode assembly 710 to prevent deformation thereof. In addition, the lithium secondary battery 700 further includes a lower insulation plate 770 formed under the electrode assembly 710.

In the lithium secondary battery 700 having the above construction, a notched part 740 is formed at a lower part of the cylindrical can 720. The notched part 740 may be formed to surround a circumference of the lower part of the cylindrical can 720, or may be formed on a bottom surface of the cylindrical can 720. The notched part 740 may be formed as a linear or zigzag continuous rupture groove. Thus, similarly to the rectangular lithium secondary battery 100 according to the above embodiments, the notched part 740 of the lithium secondary battery 700 is ruptured in the vertical compression test and thus the electrode assembly 710 can be smoothly discharged downward. In addition, a short between the electrodes can be prevented to improve the safety of the lithium secondary battery 700.

As described above, the secondary battery according to the present invention produces the following effects.

First, the electrode assembly can be discharged downward during the vertical compression test by using the can provided with notches at the lower part thereof.

Second, the electrode assembly is discharged downward during the vertical compression test, thereby preventing a short between the electrodes at the upper part of the electrode assembly.

Third, safety is improved by preventing a short between the electrodes.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as being limitations of the present invention.

What is claimed is:

1. A secondary battery, comprising:
   an electrode assembly;
   a can containing said electrode assembly having an upper opening, side walls, a lower surface at an opposite end of the can to said upper opening, and a notched part, said notched part being in said side walls adjacent to said lower surface and entirely surrounding said can, or said notched part being in said lower surface of said can and extending an entire longitudinal length of said lower surface of said can; and
   a cap assembly to seal the upper opening of the can,
   wherein the notched part is a plurality of rupture grooves with intervening a space between each and every adjacent rupture groove.

2. The secondary battery of claim 1, wherein the can side walls comprise:
   a wide surface and a narrow surface, the notched part being arranged on the wide and narrow surfaces in a shape of a line parallel to the lower surface.

3. The secondary battery of claim 2, wherein said space between any two adjacent rupture grooves is narrower than a width of any other one of the plurality of rupture grooves.

4. The secondary battery of claim 3, wherein a depth of the rupture grooves is in a range of 55 to 75% of a thickness of the wide or narrow surface of the can.

5. The secondary battery of claim 4, wherein the can and cap assembly are welded together and a rupture strength of the rupture grooves is lower than a welding strength between the can and cap assembly.

6. The secondary battery of claim 2, wherein a plurality of notched parts are arranged in a direction parallel to the lower surface.

7. The secondary battery of claim 1, wherein the can comprises:
   a wide surface and a narrow surface and the notched part is arranged on the lower surface in a shape of a line.

8. The secondary battery of claim 7, wherein said space between any two adjacent rupture grooves is narrower than a width of any other one of the plurality of rupture grooves.

9. The secondary battery of claim 8, wherein a depth of the rupture grooves is in a range of 55 to 75% of a thickness of the lower surface of the can.

10. The secondary battery of claim 1, wherein the can comprises one of either a cylindrical can or a polygonal can.

* * * * *